United States Patent [19]

Taniguchi et al.

[11] Patent Number: 5,772,564
[45] Date of Patent: Jun. 30, 1998

[54] MAGNETIC BEARING SPINDLE DEVICE FOR MACHINE TOOLS

[75] Inventors: Manabu Taniguchi, Kashihara; Hirochika Ueyama, Hirakata, both of Japan

[73] Assignee: Koyo Seiko Co., Ltd., Osaka, Japan

[21] Appl. No.: 893,159

[22] Filed: Jul. 15, 1997

[30] Foreign Application Priority Data

Jul. 16, 1996 [JP] Japan ..................................... 8-185876

[51] Int. Cl.$^6$ .............................. B23Q 3/157; B23C 9/00; F16C 23/00
[52] U.S. Cl. ............................. 483/7; 310/90.5; 409/231; 451/342; 483/31
[58] Field of Search .............................. 483/1, 7, 10, 11; 310/90.5; 409/231, 194, 187; 384/115; 451/11, 342; 304/474.21

[56] References Cited

U.S. PATENT DOCUMENTS

| | | | |
|---|---|---|---|
| 5,027,280 | 6/1991 | Ando et al. ........................ | 364/474.16 |
| 5,193,953 | 3/1993 | Jesinger .................................. | 409/231 |
| 5,462,470 | 10/1995 | Oda et al. .............................. | 451/294 |
| 5,562,528 | 10/1996 | Ueyama et al. .................... | 310/90.5 X |

FOREIGN PATENT DOCUMENTS

| | | | |
|---|---|---|---|
| 352795 | 1/1990 | European Pat. Off. .............. | 310/90.5 |
| 139141 | 6/1991 | Japan .................................... | 310/90.5 |

*Primary Examiner*—William R. Briggs
*Attorney, Agent, or Firm*—Reid & Priest LLP

[57] ABSTRACT

A magnetic spindle device for machine tools has a spindle contactlessly supportable by a plurality of controllable magnetic bearings for mounting thereon a tool element which is automatically changeable for a tool element of different kind. The spindle device comprises a device for measuring the weight of the tool element by measuring the exciting currents of the magnetic bearing, and a device for changing over the control characteristics of the magnetic bearings based on the measured weight of the tool element.

3 Claims, 3 Drawing Sheets

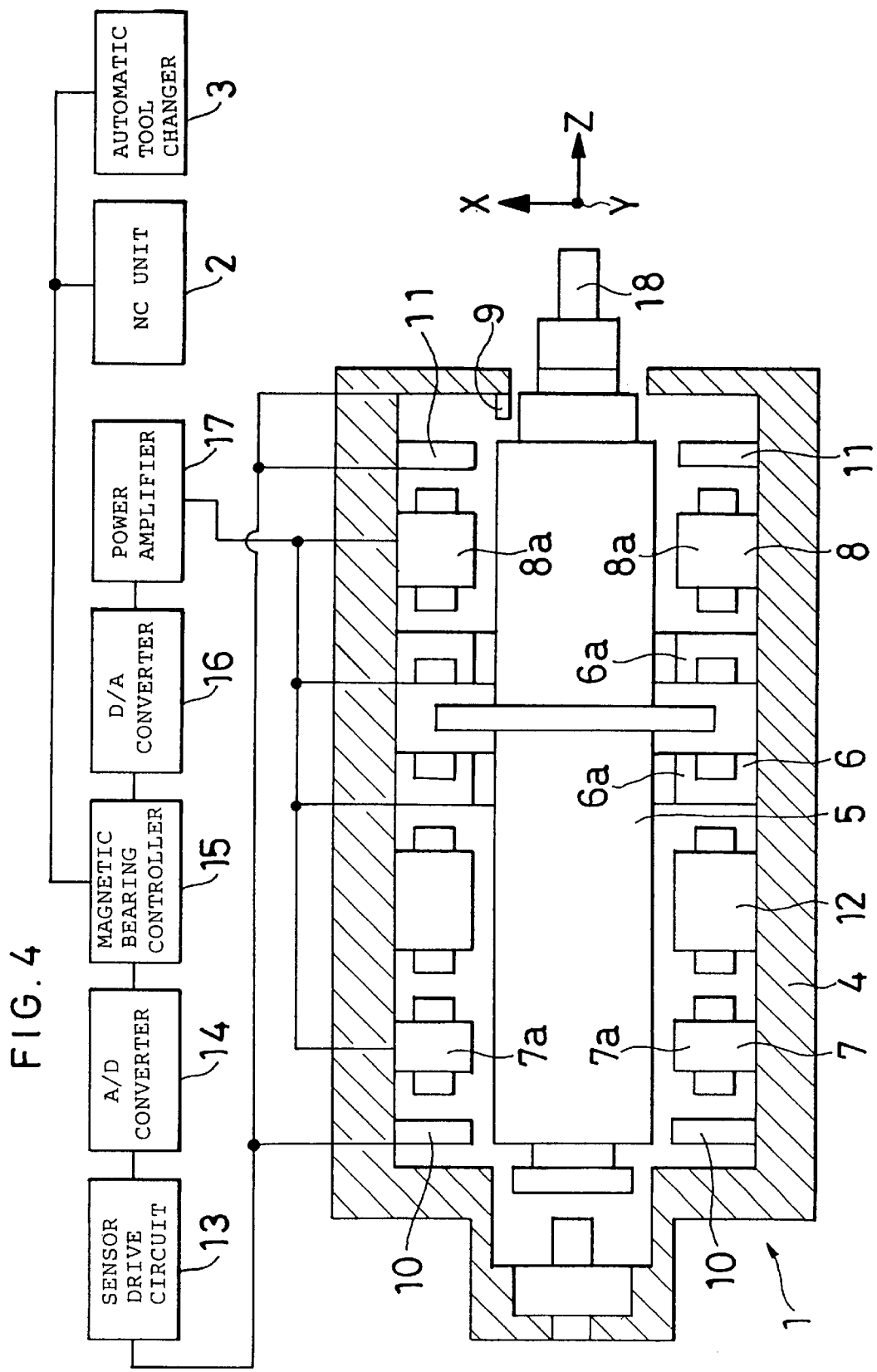

MAGNETIC BEARING SPINDLE DEVICE FOR MACHINE TOOLS

BACKGROUND OF THE INVENTION

The present invention relates to magnetic bearing spindle devices for machine tools, and more particularly to a magnetic bearing spindle device wherein a spindle for mounting a tool element thereon as in a machining center is contactlessly supportable by a plurality of controllable magnetic bearings, the tool element being automatically changeable for other different tool elements.

Magnetic bearing spindle devices for machine tools usually comprise a spindle for mounting a tool element thereon, a plurality of controllable magnetic bearings (e.g., an axial magnetic bearing and two radial magnetic bearings) for contactlessly supporting the spindle, and a controller for controlling the magnetic bearings. The controller usually controls the exciting currents to be supplied to the electromagnets of the bearings as by PID control based on the axial and radial displacements of the spindle detected by position sensors. With the conventional spindle device, the magnetic bearing controller adopts only one kind of control characteristics including gain, so that the control characteristics remain unaltered even if the tool element attached to the spindle is replaced by a different tool element.

When a different kind of tool element is mounted on the spindle of the spindle device described above, the difference in the weight of tool element alters the combined weight of the spindle and the tool element to vary the natural frequency of the entire spindle. However, the control characteristics of the magnetic bearings remain unaltered as described above, so that the control characteristics of the magnetic bearings are not always optimum depending on the kind of tool element used. This entails the problem that the magnetic bearings fail to control the position of the spindle with stability, consequently producing an adverse influence on the quality of machined workpieces or on the life the tool element.

Accordingly a spindle device has been proposed which is so adapted that one of two kinds of control characteristics of the magnetic bearings is alternatively selectable by the operator manually. However, since the operator needs to manually change over the control characteristics from one kind to the other in this case, the device not only requires a cumbersome procedure but also has the problem that the characteristics can not always be changed over adequately to ensure adequate machining conditions at all times.

SUMMARY OF THE INVENTION

An object of the present invention is to provide a magnetic bearing spindle device for machine tools wherein the control characteristics of magnetic bearings can be automatically changed over by a simple and reliable procedure in accordance with the weight of the tool element.

Another object of the invention is to provide a magnetic bearing spindle device of the vertical type for use in machine tools which comprises a spindle disposed vertically and in which the control characteristics of magnetic bearings can be automatically changed over with ease and high reliability in accordance with the weight of the tool element.

Another object of the invention is to provide a magnetic bearing spindle device of the horizontal type for use in machine tools which comprises a horizontal spindle and in which the control characteristics of magnetic bearings can be automatically changed over with ease and high reliability in accordance with the weight of the tool element.

The present invention provides a magnetic spindle device for machine tools wherein a spindle for mounting a tool element thereon is contactlessly supported by a plurality of controllable magnetic bearings, the tool element mounted on the spindle being automatically changeable for a tool element of different kind, the spindle device being characterized in that the device comprises means for measuring the weight of the tool element by measuring the exciting currents of the magnetic bearing, and means for changing over the control characteristics of the magnetic bearings based on the measured weight of the tool element.

The spindle is supported usually by an axial magnetic bearing and two radical magnetic bearings. The axial magnetic bearing usually comprises a pair of electromagnets opposed to each other axially of the spindle, and the spindle is contactlessly supported at a definite position with respect to the axial direction by the magnetic attraction of these electromagnets. Each of the radial magnetic bearings usually comprises electromagnets in two pairs in two respective radial directions orthogonal to each other, and the spindle is contactlessly supported at a definite position with respect to the two radial directions by the magnetic attraction of the electromagnets in pairs. With respect to the pair of electromagnets which are vertically or obliquely opposed to each other, the weight of the spindle is supported by the difference in magnetic attraction between the pair of electromagnets. Furthermore, there is a definite relationship between the magnetic attraction of the electromagnet and the exciting current thereof. Accordingly, the combined weight of the spindle and the tool element thereon can be calculated when the exciting currents of the electromagnets which are paired in the vertical or oblique direction are measured with the tool element mounted on the spindle. Since the spindle has a given weight already known, the weight of the tool element can be calculated, that is, can be measured from the result of the above calculation. The control characteristics of the magnetic bearings can be automatically changed over based on the weight of the tool element thus measured.

Thus according to the present invention, the control characteristics of the magnetic bearings can be automatically changed over based on the weight of the tool element, and the change-over procedure is simple and reliable. Because the control characteristics are reliably selectable which are in conformity with the tool element, each of different tool elements is usable for machining always under adequate conditions, consequently affording machined products of improved quality and giving prolonged life to the tool elements. Since the weight of the tool element can be measured by measuring the exciting currents of the magnetic bearing which is originally incorporated in the spindle device, the measurement of the weight requires no additional mechanical means.

For example, the spindle is disposed vertically and contactlessly supported by an axial magnetic bearing and radial magnetic bearings, and the measuring means measures the weight of the tool element by measuring the exciting currents of the axial magnetic bearing.

In the case where the magnetic bearing spindle device is of the vertical type wherein the spindle is disposed vertically, the weight of the spindle is supported by the difference in magnetic attraction between a pair of electromagnets vertically opposed to each other and constituting the axial magnetic bearing. Accordingly, the weight of the tool element can be measured similarly by measuring the exciting currents of the electromagnets.

The spindle device of the vertical type embodying the invention therefore has all the advantages described above.

For example, the spindle is disposed horizontally and contactlessly supported by an axial magnetic bearing and radial magnetic bearings, and the measuring means measures the weight of the tool element by measuring exciting currents of the radial magnetic bearings.

In the case where the magnetic bearing spindle device is of the horizontal type wherein the spindle is disposed horizontally, the weight of the spindle is supported by the difference in magnetic attraction between each pair of electromagnets of the radial magnetic bearings which magnets are opposed to each other vertically or obliquely. Accordingly, the weight of the tool element can be measured similarly by measuring the exciting currents of the electromagnets.

The spindle device of the horizontal type embodying the invention therefore has all the advantages described above.

BRIEF DESCRIPTION OF THE DRAWINGS

FIG. 4 is a diagram schematically showing another magnetic bearing spindle device as a second embodiment of the invention.

DESCRIPTION OF THE PREFERRED EMBODIMENTS

Embodiments of the invention for use in machine tools, for example, as machining centers will be described below with reference to the drawings.

Figure 1:
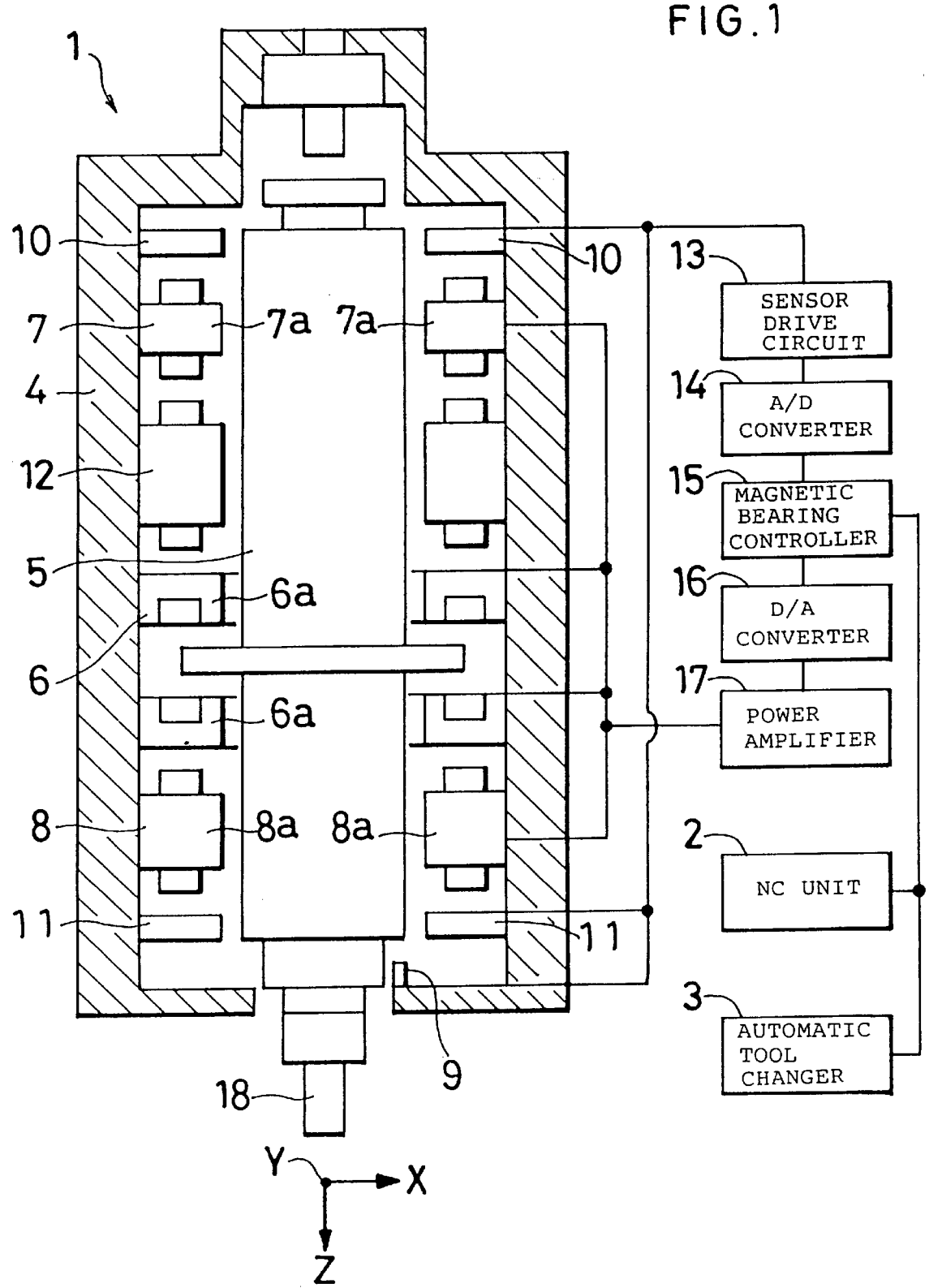
FIG. 1 is a diagram schematically showing a magnetic bearing spindle device as a first embodiment of the invention.

FIG. 1 schematically shows a first embodiment of the invention, i.e., a magnetic bearing spindle device 1, which has a numerical control unit (hereinafter referred to as the "NC unit") 2 serving as means for controlling the working operation of a machine tool, and an automatic tool changer 3 serving as automatic tool changing means.

The spindle device 1 is of the vertical type and has a spindle 5 vertically disposed within a casing 4. Further provided inside the casing 4 are controllable magnetic bearings for contactlessly supporting the spindle 5, i.e. an axial magnetic bearing 6 and upper and lower two radial magnetic bearings 7, 8, an axial position sensor 9 for detecting the axial displacement of the spindle 5, upper and lower two sets of radial position sensors 10, 11 for detecting the radial displacement of the spindle 5, and a high-frequency motor 12 serving as rotating drive means for rotating the spindle 5 at a high speed. Usually, the axial magnetic bearing 6 comprises a pair of electromagnets 6a opposed to each other axially of the spindle, and each of the radial magnetic bearings 7, 8 comprises electromagnets 7a (8a) in two pairs in two respective radial directions orthogonal to each other. In the following description, the two radial control axes (horizontal axes) orthogonal to each other will be referred to respectively as X-axis and Y-axis, and the axial control axis (vertical axis) orthogonal to these axes as Z-axis. Of the electromagnets 7a, 8a of the radial magnetic bearings 7, 8 and the radial position sensors 10, 11, those arranged along X-axis only are shown in FIG. 1. The magnetic bearings 6, 7, 8 and the position sensors 9, 10, 11 are known and therefore will not be described in detail.

The axial position sensor 9 and the radial position sensors 10, 11 are driven by a sensor drive circuit 13. The sensor drive circuit 13 detects the displacements of the spindle 5 in the axial direction (Z-axis direction) and in the radial directions (X-axis direction and Y-axis direction) based on the outputs of the sensors 9, 10, 11. The sensor drive circuit 13 feeds analog position detection signals to an A/D converter 14, which converts the signals into digital position detection signals. These signals are input to magnetic bearing control means, i.e., a magnetic bearing controller 15. The controller 15 controls the magnitude of the exciting currents to be supplied to the electromagnets 6a, 7a, 8a of the magnetic bearings 6, 7, 8 based on the digital position detection signals, i.e., based on the axial and radial displacements of the spindle 5, and comprises a digital signal processor. The term digital signal processor refers to specific hardware adapted to receive digital signals and deliver digital signals, is programmable by software and processes digital signals at a high speed in real time. The processor will hereinafter be referred to briefly as "DSP." The magnetic bearing controller 15 delivers digital control signals, which are converted by a D/A converter 16 into analog control signals. A power amplifier 17 supplies exciting currents to the respective electromagnets 6a, 7a, 8a based on the analog control signals, with the result that the spindle 5 is contactlessly supported in position with respect to the axial and radial directions by being attracted by the electromagnets 6a, 7a, 8a. The exciting currents supplied to each pair of electromagnets 6a, 7a, 8a of the bearings 6, 7, 8 along the control axis are each a constant steady-state current equal to the other and plus a control current controlled according to the position of the spindle 5.

A tool element 18 is attached to the lower end of the spindle 5. The tool element 18 is replaceable by a tool element of different kind by the automatic tool changer 3 based on a tool number command from the NC unit 2. The automatic tool changer 3 is known and therefore will not be described in detail. The tool number command from the NC unit 2 is given also to the magnetic bearing controller 15.

The NC unit 2 controls the speed of rotation of the spindle 5 and also controls the position, the direction of movement and the speed of movement of the casing 4, i.e., of the spindle 5, whereby the speed of rotation, the depth of cut and the feed speed of the tool element 18 are controlled.

The magnetic bearing controller 15 has stored therein three kinds of control characteristics according to the weight of tool elements. Stated more specifically, the weight of tool elements is divided into three ranges, i.e., a lightweight range of relatively small values of weight, a heavyweight range of relatively great weight values, and an intermediate range between these two ranges. The controller 15 has stored therein lightweight control characteristics for tool elements of the lightweight range, intermediate control characteristics for tool elements of the intermediate range and heavyweight control characteristics for tool elements of the heavyweight range. The control characteristics include, for example, control gain for PID control. The controller 15 has means for measuring the weight of tool elements, and means for changing over the control characteristics of the three magnetic bearings 6, 7, 8 according to the weight of the tool element measured. More specifically, the DSP constituting the controller 15 has stored therein a software program providing the weight measuring means and the changing-over means. In this case, the weight measuring means measures the weight of tool element by measuring the exciting currents of the electromagnets 6a of the axial magnetic bearing 6. Next, an exemplary procedure for measuring the weight of tool element and changing over the control characteristics will be described with reference to the flow chart of FIG. 2.

Figure 2:
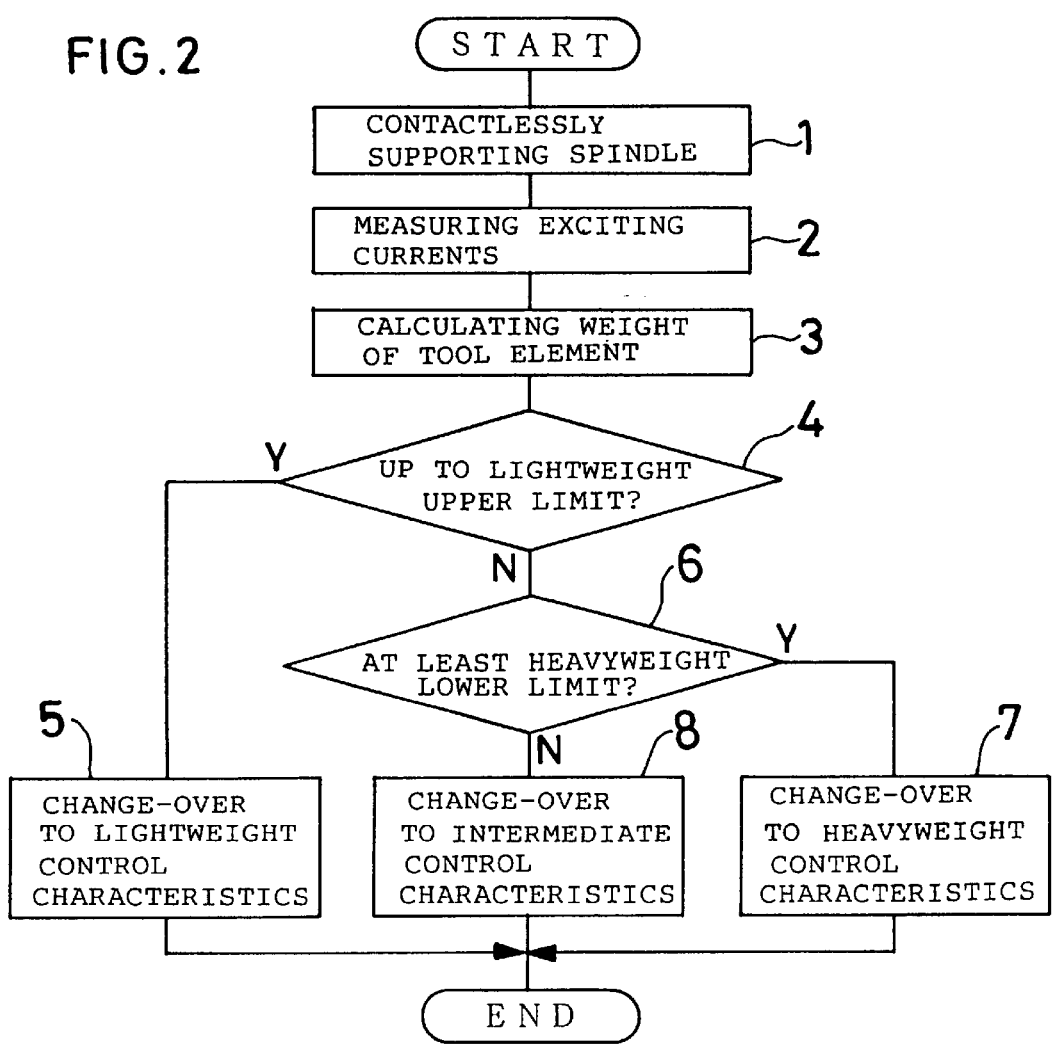
FIG. 2 is a flow chart showing an exemplary procedure for measuring the weight of a tool element and changing over control characteristics.

Referring to FIG. 2, the spindle 5 is first contactlessly supported, as held out of rotation, in the neutral position with respect to X-, Y- and Z-axes (step 1). The exciting currents of the electromagnets 6a of the axial magnetic bearings 6 are measured in this state (step 2). The current can be measured directly using a current measuring resistor connected to each electromagnet 6a. Instead of direct measurement, the exciting current can be determined alternatively by taking the digital signal value corresponding to the steady-state current and a control current and to be sent from the controller 15 to the D/A converter 16, followed by calculation.

On completion of measurement of the exciting currents of the electromagnets 6a, the weight of the tool element is calculated based on the measurements (step 3). In the case of the spindle device 1 of the vertical type shown in FIG. 1, the weight of the spindle 5 is supported by the difference in magnetic attraction between the pair of axial bearing electromagnets 6a vertically opposed to each other. The weight of the spindle 5 is given by the difference between the upward magnetic attraction of the upper magnet 6a and the downward magnetic attraction of the lower magnet 6a. Further there is a definite relationship between the magnetic attraction F of each electromagnet 6a and the exciting current I thereof as expressed by the following equation.

$$F=K\cdot(I/Z)^2$$

K is a known constant dependent on the electromagnet 6a. Z represents the clearance between the electromagnet 6a and the spindle 5 along Z-axis, is constant while the spindle 5 is supported in the neutral position, and is a known value. Accordingly, when the exciting currents of the electromagnets 6a are measured with the tool element 18 mounted on the spindle 5, the combined weight of the spindle 5 and the tool element 18 can be calculated from the above equation. The spindle 5 itself has a given weight, the value of which is stored in the controller 15. The weight of the tool element can be calculated by subtracting the weight of the spindle 5 from the result of calculation.

On completion of calculation of the weight of tool element, an inquiry is made as to whether the weight measurement is up to the upper limit value of the lightweight range (step 4). When the answer is affirmative, step 5 follows for a change-over to the lightweight control characteristics to complete the procedure. If the answer to the inquiry of step 4 is negative, the sequence proceeds to step 6 to inquire whether the weight measurement is at least the predetermined lower limit value of the heavyweight range greater than the lightweight upper limit value. When the answer is affirmative, step 7 follows for a change-over to the heavyweight control characteristics to complete the procedure. If the answer to the inquiry of step 6 is negative, step 8 follows for a change-over to the intermediate control characteristics to complete the procedure. The control characteristics change-over is made for all the three magnetic bearings 6, 7, 8.

Figure 3:
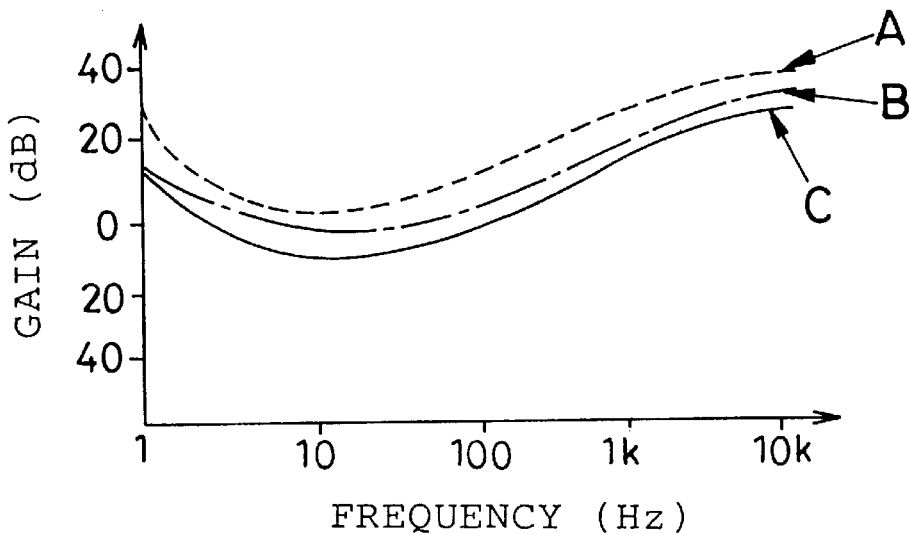
FIG. 3 is a graph showing exemplary control characteristics of a magnetic bearing.

FIG. 3 shows examples of three kinds of control characteristics stored in the magnetic bearing controller 15, i.e., lightweight control characteristics A, intermediate control characteristics B and heavyweight control characteristics with respect to the axial magnetic bearing 6. Plotted as abscissa is the number of revolutions, i.e., frequency (Hz) in logarithmic scale vs. the control gain (dB) as ordinate. Similarly, three kinds of control characteristics are also stored for each of the radial magnetic bearings 7, 8. These characteristics are changed over from one kind to another according to the weight of tool element.

In the flow chart described above, steps 1 to 3 provide the means for measuring the weight of tool element, and steps 4 to 8 provide the means for changing over the control characteristics.

The foregoing procedure for measuring the weight of tool element and changing over the control characteristics may be performed every time the tool element 18 is changed. Common machine tools generally have an invariable relationship between the tool number and the kind of tool element. In such a case, the weight measuring and characteristics changing-over procedure may be executed only once at a desired time before a particular tool element is used for machining. After the execution of the procedure, the weight of the tool element and/or the selected control characteristics may be stored along with the tool number in at least one of the magnetic bearing controller 15 and the NC unit 2. When the particular tool element 18 is mounted later, this makes it possible to change over the control characteristics in the same manner as above based on the store weight of the tool element or to effect a change-over to the stored control characteristics.

FIG. 4 is a diagram similar to FIG. 1 and showing a second embodiment. In FIGS. 1 and 4, like parts are designated by like reference numerals or symbols.

The second embodiment, i.e., another spindle device1, is of the horizontal type wherein Z-axis and Y-axis are horizontal, and X-axis is vertical.

The magnetic bearing controller 15 of this embodiment has means for measuring the weight of the tool element by measuring the exciting currents of electromagnets 7a, 8a of the radial magnetic bearings 7, 8 which magnets are arranged in the direction of X-axis.

The procedure for measuring the weight of tool element and changing over the control characteristics in the case of the second embodiment will be described below with reference to the flow chart of FIG. 2.

As is the case with the first embodiment, the exciting currents of the electromagnets 7a, 8a of the radial bearings 7, 8 along X-axis are measured in step 2, and the weight of tool element is calculated based on the measurements in step 3. In the case of the horizontal spindle device 1 with its X-axis positioned vertically as shown in FIG. 2, the weight of the spindle 5 is supported by the difference in magnetic attraction between each pair of electromagnets 7a (8a) of each radial bearing 7 (8) which are paired vertically. The weight of the spindle 5 is given by the difference between the upward magnetic attraction afforded by the upper two electromagnets 7a, 8a and the downward magnetic attraction provided by the lower two electromagnets 7a, 8a. As in the first embodiment, therefore, the weight of tool element can be calculated from the measurements of exciting currents of the X-axis electromagnets 7a, 8a of the radial magnetic bearings 7, 8. After the weight measurement, the control characteristics of the three magnetic bearings 6, 7, 8 are changed over based on the measured weight of tool element as is the case with the first embodiment.

The second embodiment is the same as the first embodiment with the exception of the above feature.

With a magnetic bearing spindle device of the horizontal type having its Y-axis positioned vertically, the weight of tool element can be calculated in the same manner as above by measuring the exciting currents of Y-axis electromagnets 7a, 8a of radial magnetic bearings 7, 8.

Magnetic bearing spindle devices of the horizontal type include those wherein X-axis and Y-axis are arranged as inclined at an angle of 45 deg with the vertical axis. The weight of tool element can be measured similarly also in this case by measuring the exciting currents of X-axis and Y-axis electromagnets 7a, 8a of radial magnetic bearings.

What is claimed is:

1. A magnetic spindle device for machine tools wherein a spindle for mounting a tool element thereon is contactlessly supported by a plurality of controllable magnetic bearings, the tool element mounted on the spindle being automatically changeable for a tool element of different kind, the spindle device being characterized in that the device comprises means for measuring the weight of the tool element by measuring the exciting currents of the magnetic bearing, and means for changing over the control characteristics of the magnetic bearings based on the measured weight of the tool element.

2. A magnetic spindle device for machine tools as defined in claim 1 which is characterized in that the spindle the spindle is disposed vertically and contactlessly supported by an axial magnetic bearing and radial magnetic bearings, and that the measuring means measures the weight of the tool element by measuring the exciting currents of the axial magnetic bearing.

3. A magnetic spindle device for machine tools as defined in claim 1 which is characterized in that the spindle is disposed horizontally and contactlessly supported by an axial magnetic bearing and radial magnetic bearings, and that the measuring means measures the weight of the tool element by measuring exciting currents of the radial magnetic bearings.

* * * * *